United States Patent
Sriram et al.

(10) Patent No.: US 6,834,074 B2
(45) Date of Patent: Dec. 21, 2004

(54) METHOD OF TIME TRACKING IN A VECTOR CORRELATOR BASED RAKE RECEIVER

(75) Inventors: Sundararajan Sriram, Plano, TX (US); Katherine G. Brown, Coppell, TX (US); Yuan Kang Lee, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 780 days.

(21) Appl. No.: 09/863,508

(22) Filed: May 23, 2001

(65) Prior Publication Data

US 2002/0176489 A1 Nov. 28, 2002

(51) Int. Cl.$^7$ ................................................. H04I 13/04
(52) U.S. Cl. ...................................... 375/142; 375/150
(58) Field of Search ................................. 375/140, 142, 375/143, 147, 150–153; 370/479, 342

(56) References Cited

U.S. PATENT DOCUMENTS 5,654,979 A  *  8/1997  Levin et al. ................. 375/142
5,867,527 A  *  2/1999  Ziv et al. .................... 375/147

* cited by examiner

*Primary Examiner*—Amanda T. Le
(74) *Attorney, Agent, or Firm*—Ronald O. Neerings; Wade James Brady, III; Frederick J. Telecky, Jr.

(57) ABSTRACT

A mechanism for implementing time tracking and early/ontime/late correlation processing in a vector correlator has been implemented to accommodate processing of data when the earliest chips in a triple data input buffer are to be processed and time tracking needs to be done to an earlier sample and further to accommodate processing of data when chips being processed are the last chips in a circular input buffer and time tracking needs to be done to a later sample.

6 Claims, 8 Drawing Sheets

Figure 7 CCP Top-Level Block Diagram

METHOD OF TIME TRACKING IN A VECTOR CORRELATOR BASED RAKE RECEIVER

RELATED PATENT APPLICATIONS

This application is related to U.S. patent application Ser. No. 09/607,410, entitled *Correlator Co-Processor For CDMA RAKE Receiver Operations*, filed on Jun. 30, 2000, by Katherine G. Brown et al. and U.S. patent application Ser. No. 09/648,184, entitled *Triple Data Buffer System For High Data Rate Communication Systems*, filed on Aug. 25, 2000, by Katherine G. Brown. These applications are incorporated by reference in their entirety herein.

BACKGROUND OF THE INVENTION

1. Field of the Invention

This invention relates generally to data communication systems and methods, and more particularly to method of time tracking in a vector correlator based Rake receiver.

2. Description of the Prior Art

Conventional Rake receivers employ chip by chip correlation techniques in which each chip is multiplied by a PN as it arrives, and the results are summed together. Although such techniques are effective, more flexibility can be obtained using vector correlation in which a plurality of chips are simultaneously multiplied by a plurality of PNs prior to summing the results. Such vector correlation can provide enhanced flexibility for example, by allowing implementation of a central data path having many fingers that can be efficiently processed. A system that employs a vector correlator based Rake receiver is disclosed in '410 and '184 U.S. patent applications referenced herein above. That system employs a circular buffer (triple data buffer) to receive incoming streams of data. Unlike time tracking techniques associated with conventional Rake receivers, time tracking techniques used with any system that employs a vector correlator must also address boundary effects due to the fixed vector of data samples available.

In view of the foregoing, it is therefore desirable to provide a method of time tracking in a system such as a vector correlator based Rake receiver that employs a circular buffer.

SUMMARY OF THE INVENTION

The present invention is directed to a method of time tracking in a system such as a vector correlator based Rake receiver that employs a circular buffer. According to one embodiment, a method of time tracking in a vector correlator based Rake receiver having a 48-chip triple data input buffer, resolves a timing change associated with a particular multipath by processing twice the number of chips that are normally processed when the earliest chips in the input buffer are to be processed and time tracking needs to be implemented with an earlier sample, and further, by idling one extra cycle to prevent chip processing for a particular cycle when the chips being processed are the latest 16-chips in the 48-chip triple data input buffer and time tracking needs to be implemented with a later sample before tracking to the earliest 16-chips in the input buffer. A predetermined software algorithm directs specific hardware to track early, ontime, or late; and the hardware determines if the earliest or latest chips in the input buffer need to be processed.

According to one embodiment, a method of time tracking in a vector correlator comprises the steps of:

providing a vector correlator based system having a triple data input buffer wherein two of three buffers are available for processing by a correlator datapath while the remaining buffer is being written into by incoming chips, and further wherein one of the two buffers of the triple data input buffer contains a plurality of early sets of chips (16 in one embodiment) while the remaining buffer contains a plurality (again 16 in one embodiment) of temporally late sets of chips;

receiving chip samples into the triple data input buffer;

despreading a plurality of triple data input buffer chips (16 in one embodiment) selected from the two buffers available for processing by the correlator datapath, in a single correlation processing cycle;

detecting a timing change associated with the chip samples through commands transmitted to the vector correlator from a host processor;

detecting a first event where a timing change to an earlier sample is commanded by the host processor while the current chips being processed are the earliest in the triple data input buffer, and the sample being processed is the earliest sample;

despreading the latest samples of chips from the latest third within the triple data input buffer upon completion of the timing change command by the host processor (necessary to affect the timing change when the earlier chip sample falls outside of the earliest third of the triple data input buffer that was being processed before the timing change command);

despreading via parallel processing the earliest third of the triple data input buffer chips in the same correlation processing cycle as the latest third of the triple data input buffer chips (parallel processing necessary to ensure processing of incoming chips is not skipped);

detecting a second event where a timing change to a later sample is commanded by the host processor while the current chips being processed are the latest in the triple data input buffer, and the sample being processed is the latest sample;

skipping one correlation cycle upon the occurrence of the second event; and despreading the earliest sample of each chip associated with the earliest set of chips in the triple data input buffer upon completion of the timing change command by the host processor and subsequent to the skipped correlation cycle (necessary to prevent processing of the same set of chips twice).

According to another embodiment of the invention, a method of time tracking in a vector correlator, comprises the steps of:

providing a vector correlator based Rake receiver having a triple data input buffer having two of three buffers available for processing by a correlator datapath while the remaining buffer is being written into by incoming chips, and further wherein one of the two buffers of the triple data input buffer available for processing contains a plurality of early sets of chips (16 in one embodiment) while the remaining buffer contains a plurality (again 16 in one embodiment) of temporally late sets of chips;

receiving chip samples into the triple data input buffer;

detecting early, ontime and late timing changes associated with the received chip samples via commands transmitted to the Rake receiver from a host processor;

despreading a plurality of triple data input buffer chips (16 according to one embodiment) selected from the two buffers available for processing by the correlator datapath, in a single correlation cycle;

despreading a plurality of the earliest third of the triple data input buffer chips and a plurality of the latest third of the triple data input buffer chips in a single correlation processing cycle subsequent to wrapping the earliest set of chip samples back into the latest triple data input buffer portion such that latest triple data input buffer chips can be processed in response to the timing change to implement time tracking in subsequent processing cycles; and skipping one correlation processing cycle when the latest triple data input buffer chips are to be processed and the timing change indicates time tracking needs to be done to a later chip sample that falls outside the latest third of the triple data input buffer chip portion.

In one aspect of the invention, a method of time tracking for a system having a triple data input buffer allows demodulation of a particular multipath at a particular timing condition, even when the multipath is not constant (shifting).

In another aspect of the invention, a method of time tracking for a system having a triple data input buffer allows demodulation of a particular multipath even when the earliest available chips in the input buffer must be processed and time tracking needs to be done to an earlier sample.

In yet another aspect of the invention, a method of time tracking for a system having a triple data input buffer allows demodulation of a particular multipath even when the last available chips in the input buffer must be processed and time tracking needs to be done to a later sample.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Particular embodiments of the present method described herein address special conditions that can occur during time tracking and early/ontime/late correlation processing in a vector correlator based system such as the correlator co-processor (CCP) disclosed and claimed in the '639 patent application referenced herein above and incorporated by reference in its entirety herein. QPSK spreading is assumed for the particular embodiments discussed herein, although the same methods also apply to OQPSK (wherein an additional 0.5 chips later sample is used for OQPSK despreading).

Figure 1:
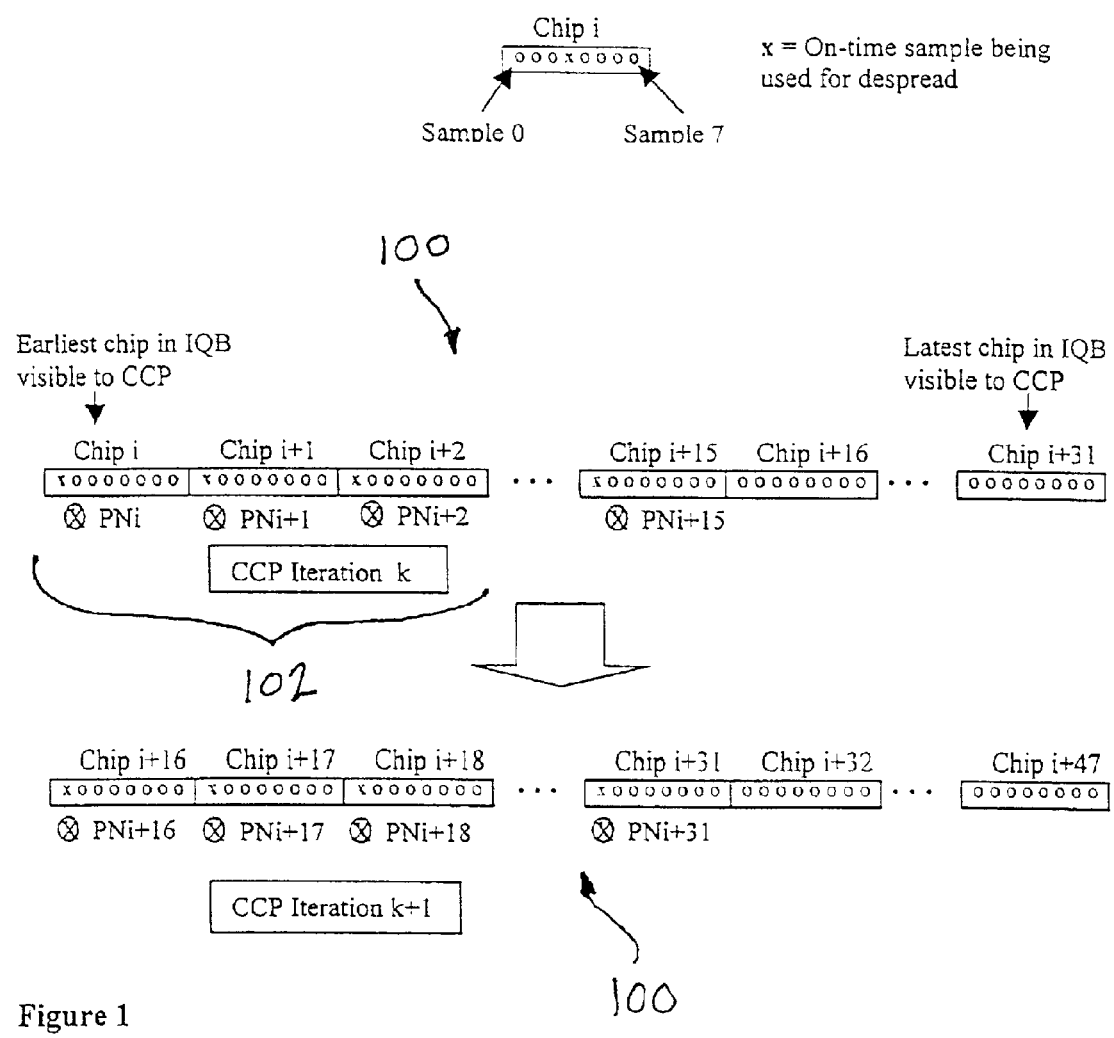
FIG. 1 illustrates a 32-chip portion of a 48-chip triple data input buffer wherein the 32-chip portion is available for processing by a correlator datapath and is associated with time tracking of a particular symbol multipath in a vector correlator based Rake receiver for the ontime sample 0, and wherein the leftmost (earliest) 16-chips of the 32-chip portion of the 48-chip triple data input buffer are despread.

FIG. 1 illustrates a 32-chip portion of a 48-chip triple data input buffer 100 associated with time tracking of a particular symbol multipath in a vector correlator based Rake receiver for an initial condition using an ontime sample 0, and wherein the leftmost 16-chips 102 of the 32-chip input buffer 100 are despread. The alphanumeric character "x" denotes the ontime sample being used for despread. A 16-chip time duration (in this embodiment) is referred to as a CCP iteration. The triple data buffer implements a sliding buffer of 16-chips in which the buffer slides by an interval of 16-chips in a circular fashion in each iteration. At each CCP iteration, 32-chips from the 48-chip chip triple data input buffer 100 are available for processing by the CCP datapath. At the next iteration, a new set of 16-chips, along with an older set of 16-chips, becomes available to the datapath. In FIGS. 1–6 discussed herein, the input buffer slides to the left by 16-chips at each iteration, and so the left set of 16-chips in iteration "k" is the same as the rightmost set of 16-chips in the previous iteration (i.e. iteration "k–1"). The rightmost set of 16-chips in each iteration are the new set of chips that come into the input buffer 100. During the first iteration k, sample 0 in chip "i" through chip i+15 is multiplied by its respective PN. Since no samples arrived early or late, sample 0 in chip i+16 through chip i+31 are then multiplied by their respective PNs during the next iteration k+1.

Figure 2:
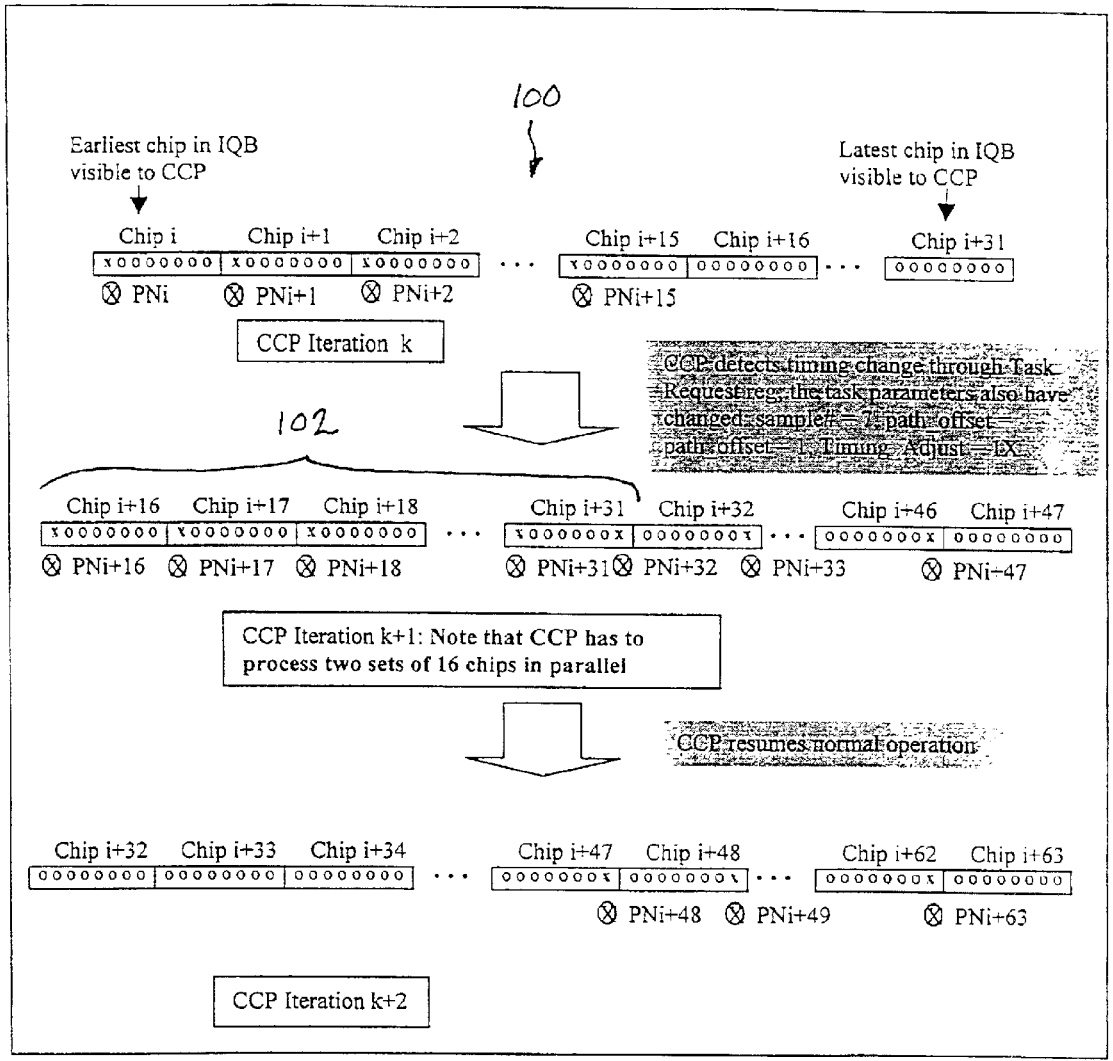
FIG. 2 illustrates a 32-chip portion of a 48-chip triple data input buffer wherein the 32-chip portion is available for processing by a correlator datapath and is associated with time tracking of a particular symbol multipath in a vector correlator based Rake receiver wherein the earliest chips in the 32-chip portion of the 48-chip triple data input buffer are to be processed and time tracking needs to be implemented with an earlier sample.

FIG. 2 illustrates a 32-chip portion of a 48-chip triple data input buffer 100 wherein the 32-chip portion is available for processing by a correlator datapath and is associated with time tracking of a particular symbol multipath in a vector correlator based Rake receiver wherein the earliest chips in the 48-chip input buffer 100 are to be processed and time tracking needs to be implemented with an earlier sample. During the first iteration k, sample 0 in chip "i" through chip i+15 is multiplied as normally done for each ontime sample, by its respective PN. In this instance however, the Rake receiver has detected a timing change request in which a chip sample (sample 7) has arrived early and therefore does not appear in the first 16-chip buffer 102. The early arriving sample 7 is then wrapped around so that it appears with a later arriving sample 0 in (chip i+31) such that chip i+31 now contains sample 0 as well as sample 7 (the earlier arriving sample). The vector correlator based Rake receiver, e.g. CCP, must now process two sets of 16-chips (chip i+16 through chip i+47) in parallel during the next iteration k+1. During the next iteration k+2, the Rake receiver then resumes its normal operation, but using a timing change that allows processing of sample 7 in each chip rather than sample 0 that was used before the timing shift. It can be seen from FIG. 2 that in the iteration in which the timing update takes effect, 32-chips are processed (despread). This means that for symbol fingers (SF) equal to or less than 16, twice the number of despread symbols would be dumped into a finger symbol buffer (FSB): when SF=16, two symbols get dumped in this special situation (normally it is one symbol per CCP iteration); when SF=8, four symbols get dumped instead of two, and so on. It can be appreciated then that when SF=16, the special case of timing retard shown in FIG. 2 will cause the symbol to be dumped 16-chips earlier (one CCP iteration earlier) than normal. It can also be appreciated than when SF=2, 16 symbols are dumped in the instant case of timing retard shown in FIG. 2. If the FSB memory used does not have enough ports to support storage of 16 symbols in a single clock cycle, two cycles must then be consumed for each despreading operation. Early/late despreading operations most preferably should then be allocated two cycles when such a special case occurs. When SF=2 for example, the number of cycles for a particular CCP may be (2* Number_of walsh_channels_with_SF2+(Number_of_walsh_channels_with_SF>2)+3) CCP cycles for RC3/4 fingers for the duration of a frame in which timing change is enabled.

Figure 3:
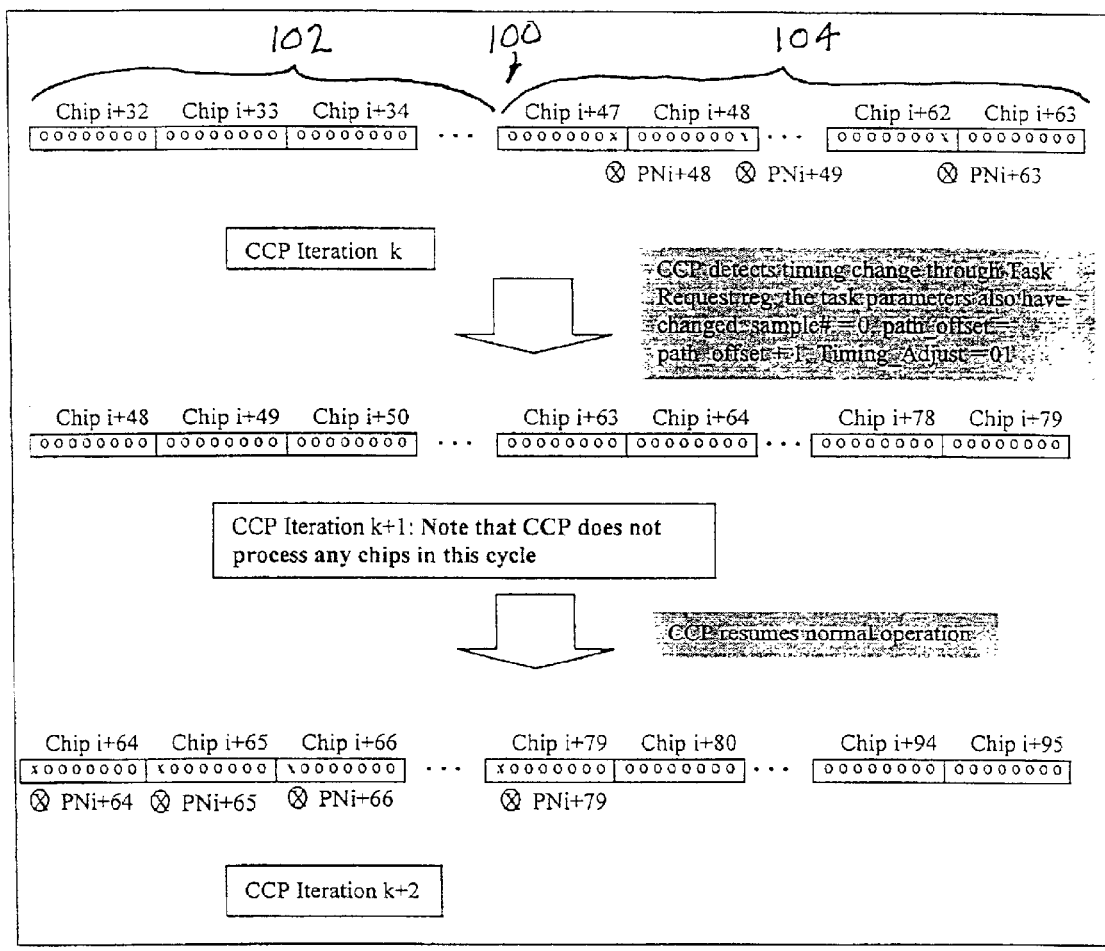
FIG. 3 illustrates a 32-chip portion of a 48-chip triple data input buffer wherein the 32-chip portion is available for processing by a correlator datapath and is associated with time tracking of a particular symbol multipath in a vector correlator based Rake receiver wherein the chips being processed are the latest 16-chips in the 32-chip portion of the 48-chip triple data input buffer and time tracking needs to be implemented with a later sample before tracking to the lower 16-chips in the 32-chip input buffer.

FIG. 3 illustrates a 32-chip portion of a 48-chip triple data input buffer 100 wherein the 32-chip portion is available for processing by a correlator datapath and is associated with time tracking of a particular symbol multipath in a vector correlator based Rake receiver wherein the chips being processed are the latest 16-chips 104 in the 32-chip input buffer 100 and time tracking needs to be implemented with a later sample before tracking to the lower 16-chips 102 in the 32-chip input buffer 100. During the first iteration k, sample 7 is being used, and the path offset is such that chips 15 (i+47) to 30 (i+62) of the 32-chips currently available to the CCP in the current CCP iteration are used by the CCP. A timing change request is then received by the CCP to change the timing to sample 0 of the next chip. Since the next chip has net yet arrived, the chips i+47 to i+62 cannot simply be wrapped around into the first 16-chip buffer 102 since some of the chips would then erroneously be processed twice. The solution is to provide an idle cycle during the next iteration k+1 so that chips 15 (now chip i+64) through 30 (now chip i+79) can be processed using sample 0 during the next iteration k+2 as well as subsequent iterations until a timing change is again requested.

The special conditions discussed herein before with reference to FIGS. 2 and 3 that occur during time tracking in a vector correlator based Rake receiver or system incorporating a circular buffer, e.g. CCP, effect the early/ontime/late cycles individually. When the sample used for the late correlation corresponds to FIG. 2 for example, then the late correlation will produce extra correlation results (may result in a late dump that is at an earlier CCP iteration). The ontime and early correlations clearly will not generally have this special condition; therefore, this special case will apply only to the late correlation cycle. The special conditions shown in FIGS. 2 and 3 are most preferably checked individually for the early/ontime/late cycles, especially since these conditions occur at different points in a typical rake operation for early/ontime/late correlations.

Figure 4:
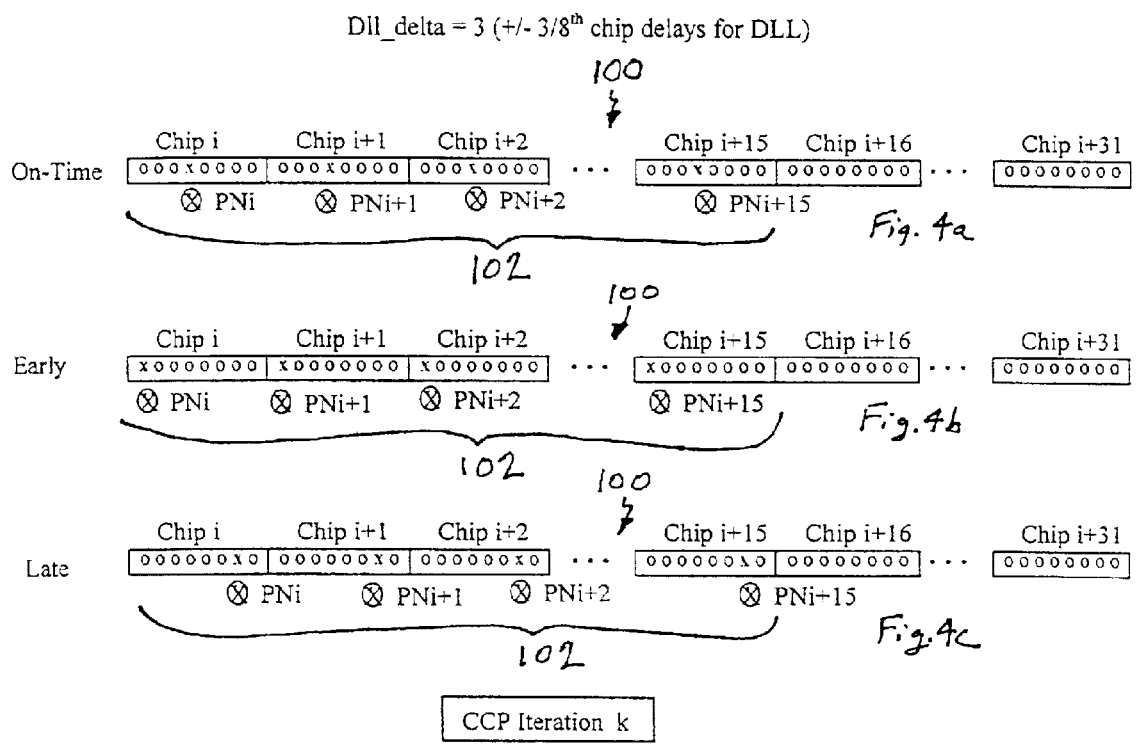
FIG. 4 illustrates a 32-chip portion of a 48-chip triple data input buffer that is available for processing by a correlator datapath and that is associated with time tracking of a particular symbol multipath in a vector correlator based Rake receiver during normal early-ontime-late symbol despreading.

Special cases of early/ontime/late correlations occur when the on-time sample is near a chip boundary, and when 16 selected chips from the input buffer 100 are near the input buffer 100 boundaries. FIG. 4 illustrates a 32-chip portion of a 48-chip triple data input buffer 100 wherein this 32-chip portion is available for processing by a correlator datapath and is associated with time tracking of a particular symbol multipath in a vector correlator based Rake receiver during normal early/ontime/late symbol despreading. Specifically, FIG. 4a depicts ontime processing of sample 3 for the first 16-chips 102 of the input buffer 100. FIG. 4b depicts processing of a symbol that has arrived 3-chips early at the input buffer 100 so that it now appears as sample 0, but still shows up completely within the first 16-chips 102 of the input buffer 100. FIG. 4c depicts processing of a symbol that has arrived at the input buffer 100 delayed by 3-chips so that it now appears as sample 6, but again still shows up completely within the first 16-chips 102 of the input buffer 100.

Figure 5:
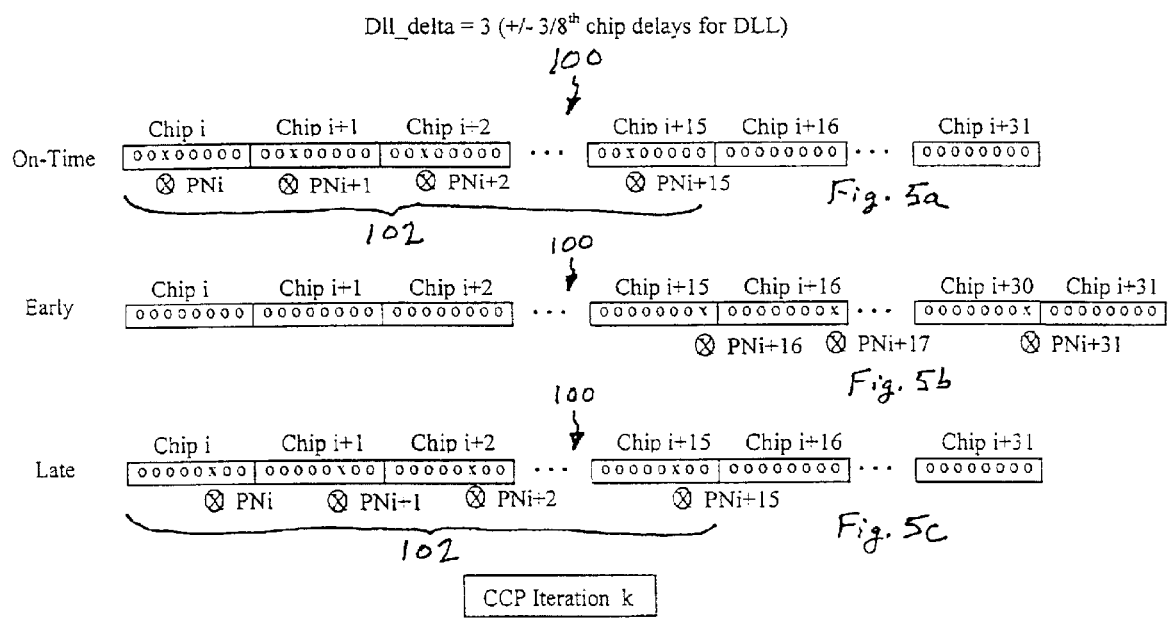
FIG. 5 illustrates a 32-chip portion of a 48-chip triple data input buffer that is available for processing by a correlator datapath and that is associated with time tracking of a particular symbol multipath in a vector correlator based Rake receiver in which the early correlation leads the ontime correlation by 1 Rake receiver cycle (iteration)

FIG. 5 illustrates a 32-chip portion of a 48-chip triple data input buffer 100 wherein this 32-chip portion is available for processing by a correlator datapath and is associated with time tracking of a particular symbol multipath in a vector correlator based Rake receiver in which the early correlation leads the ontime correlation by 1 Rake receiver cycle (iteration). This condition occurs when the early sample falls "out of" the input buffer 100 and will occur if the ontime sample number is less than the maximum possible time shift and the ontime chips being processed are the left-most 16-chips 102 in the input buffer 100. Specifically, FIG. 5a depicts ontime processing of sample 2 for the first 16-chips 102 of the input buffer 100. FIG. 5b depicts processing of a symbol that has arrived 3-chips early at the input buffer 100 so that it now appears as sample 7 of chips i+15 through i+30 of input buffer 100. The early correlation therefore leads the ontime correlation by one CCP iteration. This also implies that under this special situation, the early correlation results are available in the early/ontime/late output buffer one iteration earlier than the ontime/late results. FIG. 5c depicts processing of a symbol that has arrived at the input buffer 100 delayed by 3-chips so that it now appears as sample 5, but again still shows up completely within the first 16-chips 102 of the input buffer 100.

Figure 6:
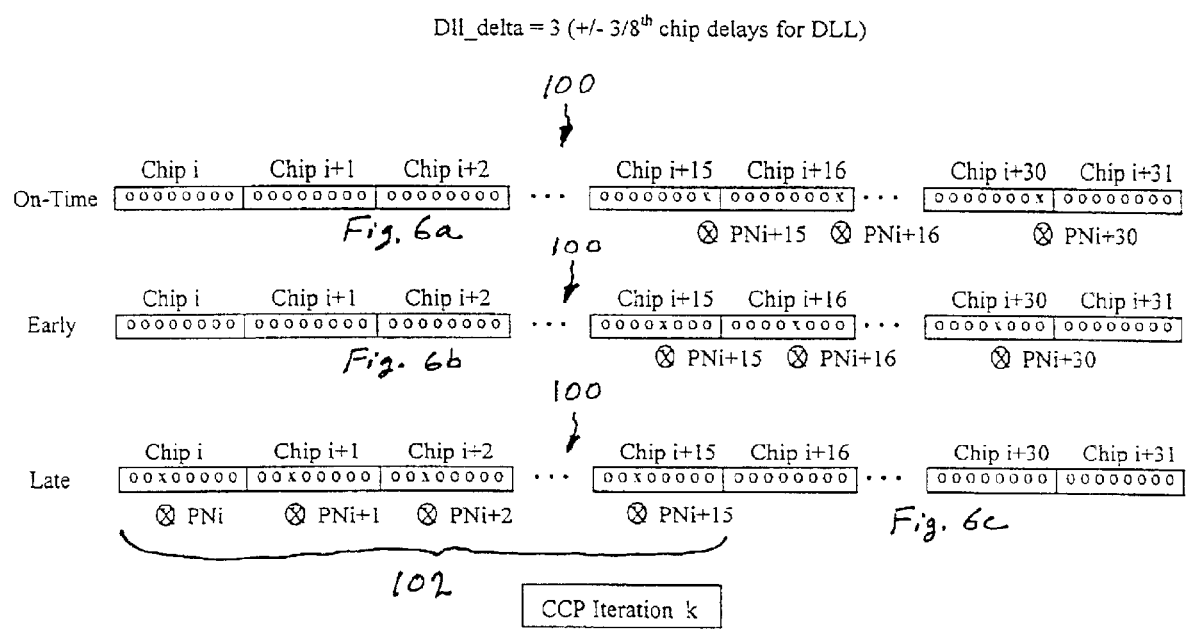
FIG. 6 illustrates a 32-chip portion of a 48-chip triple data input buffer that is available for processing by a correlator datapath and that is associated with time tracking of a particular symbol multipath in a vector correlator based Rake receiver in which the late correlation lags the ontime correlation by 1 Rake receiver cycle (iteration)

FIG. 6 illustrates a 32-chip portion of a 48-chip triple data input buffer 100 wherein this 32-chip portion is available for processing by a correlator datapath and is associated with time tracking of a particular symbol multipath in a vector correlator based Rake receiver in which the late correlation lags the ontime correlation by 1 Rake receiver cycle (iteration). This condition occurs when the late samples fall "to the right of" chip 30 in the input buffer 100. Chip 31 of the input buffer 100 is unused for QPSK spreading and is used instead for OQPSK spreading when samples delayed by 0.5 chip are required. This will occur for example, if the ontime sample number plus the maximum possible time shift is greater than seven and the ontime chips being processed are chip 15 through chip 30 in the input buffer 100. Specifically, FIG. 6a depicts ontime processing of sample 7 for the chips i+15 through i+30 of the input buffer 100. FIG. 6b depicts processing of a symbol that has arrived 3-chips early at the input buffer 100 so that it now appears as sample 4 of chips i+15 through i+30 of input buffer 100. FIG. 6c depicts processing of a symbol that has arrived at the input buffer 100 delayed by 3-chips that has been wrapped around to the lower 16-chips 102 so that it now appears as sample 2 of chip i through chip i+15 of input buffer 100. The late correlation lags the ontime correlation by one CCP iteration since it now uses chip 0 to chip 15. This also implies that under this special condition, the late correlation results are available in the early/ontime/late output buffer one iteration later than the early/ontime results.

Since early/ontime/late correlations do not necessarily finish in the same CCP iteration cycle, one must be careful in terms of when interrupts are issued to a DSP, for example, and when finger parameters change. If the ontime correlation, for example, completes at CCP iteration "k", then it may happen that the early/ontime correlation is complete at iteration k, but the late correlation completes at iteration k+1; or it may happen that the early/ontime correlation is complete at iteration k, but the early correlation completes at iteration k+1. One default solution would interrupt the DSP using ontime correlation timing; late data output from the early/ontime/late memory must be delayed by one CCP iteration period (16-chip periods) in order to ensure getting the newest data under all situations.

Figure 7:
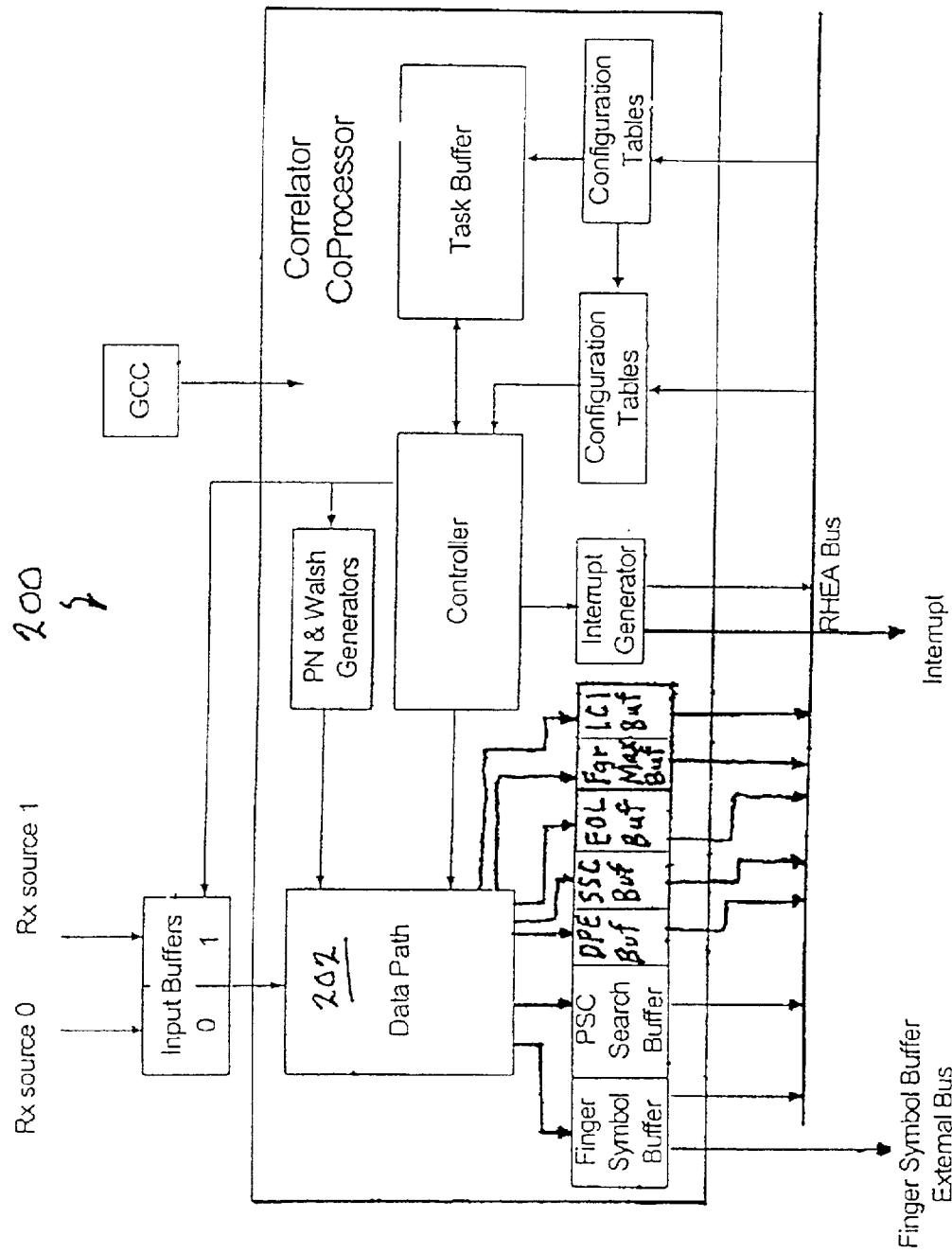
FIG. 7 is a simplified top level block diagram illustrating a correlator coprocessor (CCP) that is a centralized correlation machine that can be used for various Rake receiver tasks such as finger spreading and search, to accommodate most functions common to Rake receivers, regardless of the particular wireless protocol.

FIG. 7 is a simplified top level block diagram illustrating a correlator coprocessor (CCP) 200 that is a centralized correlation machine that can be used for various Rake receiver tasks such as finger spreading and search, to accommodate most functions common to Rake receivers, regardless of the particular wireless protocol. The CCP 200 is a vector correlator based system that is particularly suitable for implementing the present methods and has been described in detail in the '639 patent application referenced above that is incorporated by reference in its entirety herein. Briefly, the CCP 200 is particularly suitable for supporting spread-spectrum CDMA communication systems. The CCP 200 is a programmable, highly flexible, vector-based correlation machine that performs CDMA base station and mobile station Rake receiver operations. Each Rake receiver task uses a common centralized data path 202 of the CCP 200 in a time-multiplexed fashion, so that many different tasks can be simultaneously performed on the CCP 200. The main data path 202 is vectorized in order to reduce power dissipation, among other things. As stated in the '639 application referenced herein before, the CCP 200 is capable of performing complex valued correlations that consist of despreading and coherent accumulation. The CCP 200 is also capable of performing non-coherent accumulations such as accumulating "symbol" energy values and returning the accumulated energy values for a specified window of offsets for search operations. The CCP 200 can, for example, accumulate early, ontime and late samples of Rake fingers for use in a finger's code-tracking loop (typically a delay-locked loop (DLL)).

Figure 8:
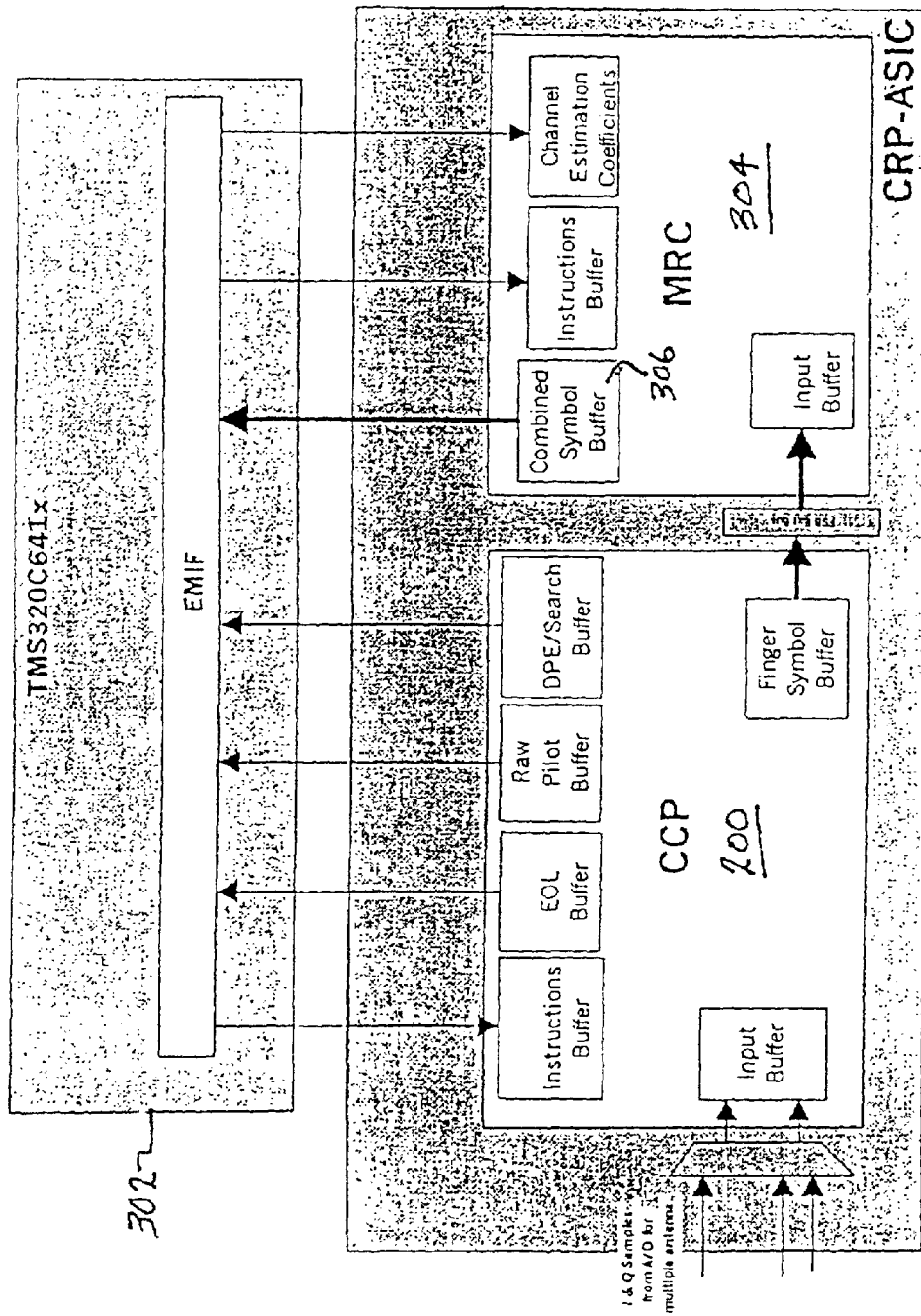
FIG. 8 illustrates one implementation of a digital baseband system that includes the CCP shown in FIG. 7, a digital signal processor (DSP), and a maximal-ratio combining (MRC) ASIC.

FIG. 8 illustrates one implementation of a digital baseband system 300 that includes the CCP 200 shown in FIG. 7, a digital signal processor (DSP) 302, and a maximal-ratio combining (MRC) ASIC 304. The CCP 200 is responsible for 1) performing the despreading necessary to provide data symbols per finger to the entity (e.g. DSP 302 or another ASIC), in charge of the MRC 304 processing, 2) performing early/ontime/late energy measurements for a DLL, 3) performing on-chip and ½-chip correlations and energy measurements for delay profile estimation and search purposes, and 4) providing raw pilot symbols per finger to the DSP 302. The DSP 302 uses the computed raw pilot symbols to perform the channel estimation of each finger. Coefficients of the channel estimation are then sent to the entity in charge of the MRC processing, e.g. MRC ASIC 304 or DSP 302. Using those computed coefficients, the MRC ASIC 304 multiplies despread symbols with the channel estimation coefficients and then sums the symbols coming from various fingers (paths) together to provide combined symbols in the combined symbol buffer 306.

In view of the above, it can be seen the present invention presents a significant advancement in the art of time tracking and early/ontime/late correlation processing in a vector correlator. A mechanism for implementing time tracking has been implemented to accommodate processing of data when the earliest chips in a triple data input buffer are to be processed and time tracking needs to be done to an earlier sample and further to accommodate processing of data when chips being processed are the last chips in a circular input buffer and time tracking needs to be done to a later sample. Particular embodiments have been described in considerable detail in order to provide those skilled in the Rake control art with the information needed to apply the novel principles and to construct and use such specialized components as are required. In view of the foregoing descriptions, it should further be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of time tracking in a vector correlator, comprising the steps of:

(a) providing a vector correlator based system having a triple data input buffer having three parts wherein two of the three parts are available for processing by a correlator datapath while the remaining part is being written into by incoming chips, and further wherein one of the two parts of the triple data input buffer available for processing contains a plurality of early sets of chips while the remaining part contains a plurality of temporally late sets of chips;

(b) receiving chip samples into the triple data input buffer; and (c) despreading a plurality of triple data input buffer chips selected from the two buffers available for processing by the correlator datapath in a single correlation processing cycle.

2. The method according to claim 1 further comprising the steps of:

(d) detecting a timing change associated with the chip samples via commands transmitted to the vector correlator from a host processor;

(e) detecting an event where a timing change to an earlier chip sample is commanded by the host processor while the current chips being processed are the earliest in the triple data input buffer, and the sample being processed is the earliest sample;

(f) despreading the latest samples of chips from the latest third within the triple data input buffer upon completion of the timing change command by the host processor; and (g) despreading via parallel processing the earliest third of the triple data input buffer chips in the same correlation processing cycle as the latest third of the triple data input buffer chips.

3. The method according to claim 1 further comprising the steps of:

(d) detecting an event where a timing change to a later sample is commanded by the host processor while the current chips being processed are the latest in the triple data input buffer, and the sample being processed is the latest sample;

skipping one correlation cycle upon the occurrence of the event; and despreading the earliest sample of each chip associated with the earliest set of chips in the triple data input buffer upon completion of the timing change command by the host processor and subsequent to the skipped correlation cycle.

4. A method of time tracking in a vector correlator, comprising the steps of:

(a) providing a vector correlator based Rake receiver having a triple data input buffer having two parts available for processing by a correlator datapath while a remaining part is being written into by incoming chips, wherein one of the two parts available for processing by the correlator datapath contains a plurality of early sets of chips while the remaining part contains a plurality of temporally late sets of chips;

(b) receiving chip samples into the triple data input buffer;

(c) detecting early, ontime and late timing changes associated with the received chip samples via commands transmitted to the vector correlator from a host processor;

(d) despreading in a single processing cycle, a plurality of triple data input buffer chips selected from the two buffers available for processing by the correlator datapath;

(e) despreading the plurality of the earliest third of the triple data input buffer chips and the plurality of latest third of the triple data input buffer chips in a single correlation processing cycle subsequent to wrapping the earliest set of chip samples back into the latest input buffer portion such that latest input buffer chips can be processed in response to the timing change to implement time tracking in subsequent processing cycles; and (f) skipping one correlation processing cycle when the latest input buffer chips are to be processed and the timing change indicates time tracking need to be done to a later chip sample that falls outside the latest third of the triple data input buffer chip portion.

5. The method according to claim 4 further comprising the steps of:

(g) despreading the plurality of the earliest third of the triple data input buffer chips and the plurality of latest third of the triple data input buffer chips in a single correlation processing cycle subsequent to wrapping the earliest set of chip samples back into the latest input buffer portion such that latest input buffer chips can be processed in response to the timing change to implement time tracking in subsequent processing cycles.

6. The method according to claim 4 further comprising the steps of:

(g) skipping one correlation processing cycle when the latest chips in the triple data input buffer are being processed and the timing change indicates time tracking needs to be done to a later chip sample that falls outside the input buffer; and (h) despreading the plurality of earliest chips in the input buffer in response to the timing change and subsequent to the skipped correlation processing cycle.

* * * * *